United States Patent Office 3,445,500  
Patented May 20, 1969

---

3,445,500  
PROCESS OF PREPARING UNSATURATED NITRILES  
Jamal S. Eden, Akron, Ohio, assignor to The B. F. Goodrich Company, New York, N.Y., a corporation of New York  
No Drawing. Filed Feb. 28, 1967, Ser. No. 619,173  
Int. Cl. C07c *121/32, 51/00;* B01j *11/82*  
U.S. Cl. 260—465.3                    7 Claims

ABSTRACT OF THE DISCLOSURE

Acrylonitrile or methacrylonitrile are prepared by reacting propylene or isobutylene, ammonia and oxygen at elevated temperatures in the presence of a catalyst containing molybdenum, tellurium, thorium, oxygen and phosphorous.

---

BACKGROUND OF THE INVENTION

Nitriles have been prepared by ammoxidation of hydrocarbons, especially from the normally gaseous hydrocarbons using a variety of heavy metal compound catalysts in one and two step processes. In the preferred one step process, many of the prior catalysts and procedures for ammoxidizing propylene or isobutylene to acrylonitrile or methacrylonitrile are not satisfactory. The catalysts either have a very short active life, or only a portion of the hydrocarbon is converted to the desired unsaturated nitrile per pass; hydrocarbons often are oxidized excessively to form high proportions of carbon monoxide or carbon dioxide or both, or there is not sufficient selectivity, so that the hydrocarbon molecule is attacked at both the olefinic unsaturation and at a methyl group and large amounts of HCN and acetonitrile are formed. Improved and alternate processes are desired.

SUMMARY OF THE INVENTION

In accordance with is invention acrylonitrile or methacrylonitrile are prepared by ammoxidation of monoolefinic hydrocarbons containing 3 to 4 carbon atoms at an elevated temperature by passing gaseous propylene or isobutylene, ammonia and an oxygen-containing gas at a temperature of from above about 350° C. to about 500° C., over a catalyst comprising molybdenum, tellurium, thorium, oxygen and phosphorous calculated as, in a molar ratio, $MoO_3$ 100, $TeO_2$ 10–100, and a thorium phosphate 10–100. The catalyst can also be designated as $Mo_{10}Te_{1-10}Th_{2-20}P_{2-20}O_{39-120}$, with P being in the form of a phosphate, i.e., each P atom is attached to 3 to 4 oxygen atoms and the ratio of Th to P is from 1:2 to 3:4. By means of the present process, conversions from over 85 to as high as 98% per pass of a monoolefin containing 3 to 4 carbon atoms and high yields of acrylonitrile or methacrylonitrile are obtained with long active life of the catalyst.

DETAILED DESCRIPTION

The reactants

The essential reactants are propylene or isobutylene, ammonia and an oxygen-containing gas, which can be pure oxygen, oxygen enriched air or air without additional oxygen. For reasons of economy, air is the preferred oxygen-containing reactant. The addition of steam into the reactor along with the monoolefin, ammonia and an oxygen-containing gas is desirable but not absolutely essential. The function of steam is not clear, but it does seem to reduce the amount of carbon monoxide and dioxide in the effluent gases. Other diluent gases can be used. Saturated hydrocarbons such as propane or butane are rather inert under the reaction conditions. Nitrogen, argon, krypton or other known inert gases can be used as diluents if desired but are not preferred because of the added cost.

The catalyst and its preparation

There are several methods for the preparation of the catalyst, which can be supported or unsupported. It is possible to dissolve each of the starting ingredients in water and combine them from the aqueous solutions, or the ingredients can be dry blended. Because of the more uniform blend obtained by the solution procedure, it is preferred.

A general procedure for preparing a catalyst from water-soluble ingredients is to (1) dissolve the requisite amount of a molybdenum salt, a tellurium salt and a thorium salt in water, (2) add the requisite amount of phosphoric acid to the thorium salt solution, (3) add the tellurium salt solution to the molybdenum salt solution, and (4) then add the thorium salt-phosphoric acid mixture to the molybdenum-tellurium salt mixture. The catalyst is then dried and baked at 400° C. for about 16 hours.

Supported catalyst can be prepared by adding a dry support or an aqueous slurry thereof to the aqueous solution of catalyst or the aqueous catalyst ingredients can be added to the slurry of the support. Alternatively a slurry of the catalyst ingredients can be prepared in water, then dried and baked. For supported catalysts the aqueous slurry of the catalyst ingredients can be added to an aqueous suspension of the support or vice versa, and then dried and baked. Another method is to blend the dry ingredients of the desired particle size and then mix them thoroughly. Thorough blending and uniform particle size is desired.

A specific example (A) of the solution method is now set forth.

(1) Dissolve 158.94 g. of $(NH_4)_6Mo_7O_{24} \cdot 4H_2O$ in 450 ml. of water.

(2) Dissolve 47.88 g. of $TeO_2$ in 100 ml. conc. HCl and add to (1).

(3) Dissolve 165.67 g. of $Th(NO_3)_4 \cdot 4H_2O$ in water and add 69.2 g. of 85% $H_3PO_4$. Add this mixture slowly to the mixture of (1) and (2).

Dry on a steam bath and calcine in a hot tube oven for 16 hours at 400° C. Thereafter, the catalyst is ground to the desired mesh size and sieved; for Examples 1–3, passed 10 mesh, held on 18 mesh screen (U.S.).

An example (B) of preparation of a supported catalyst is:

(1) Dissolve 79.47 g. of $(NH_4)_6Mo_7O_{24} \cdot 4H_2O$ in 300 ml. of water and add to 90 grams of catalyst silica in 200 ml. of water. (Microspheroidal silica Ludox H.S.)

(2) Dissolve 23.94 g. of $TeO_2$ in 50 ml. of concentrated HCl and mix with (1).

(3) Dissolve 82.83 g. of $Th(NO_3)_4 \cdot 4H_2O$ in 200 ml. of water and add 34.6 g. of 85% $H_3PO_4$. This mixture is added slowly to (1) and (2).

Dry on a steam bath and bake in a hot tube for 16 hours at 400° C. Thereafter, the catalyst is ground to the desired mesh size for fixed or fluid bed reactions and sieved; for Examples 4–5, fluid bed, passed 80 and held on 325 screen (U.S.).

Among the suitable supports are silica, silica containing materials, such as diatomaceous earth, kieselguhr, silicon carbide, clay, aluminum oxides and even carbon, although the latter tends to be consumed during the reaction.

Such catalysts with molar ratios of 100 Mo, 10–100 Te and 10–100 of a thorium phosphate can be used for ammoxidizing the monoolefinic hydrocarbon to acrylonitrile or methacrylonitrile. The catalyst contains chemically bound oxygen so that the generic formula can be written as $MoO_3\ _{100}TeO_2\ _{10-100}ThP_2O_7$ or other thorium phosphate $_{10-100}$. The phosphate can be $PO_4^{-3}$, $P_2O_7^{-4}$, or a polyphosphate.

Reaction conditions

The reaction can be carried out in either a fixed or fluidized catalyst bed.

The reaction temperature can range from about 350° C. to 500° C. but the preferred range is from about 375° C. to about 475° C. Below about 375° C. the conversion of monoolefin per pass and yield of unsaturated nitrile is lower than desirable. Usually, a longer contact time is needed at lower temperatures to obtain the yields of unsaturated nitriles obtainable at temperatures in the optimum range. Above about 48° C. some of acrylonitrile may be oxidized to carbon oxides, acetontrile and HCN. The mol ratio of oxygen to propylene should be from 1.5 to 1 and preferably from 2 to 1 to 4 to 1 for good conversion and yields, but ratios with some excess oxygen, 33 to 100% are even more desirable and preferred. There is no critical upper limit as to the amount of oxygen, but when air is used as the oxygen-containing gas it is obvious that too great an excess will require larger reactors, pumps, compressions and other auxiliary equipment for any given amount of desired end product. It is therefore better to limit the amount of air to provide 33 to 66% excess of oxygen. This range provides the largest proportion of nitrile, under given reaction conditions. Also, since care is needed to avoid an explosive mixture, the limiting of air aids in that direction. The mol ratio of ammonia to propylene can range from about 0.5 to 1 to about 1.75 to 1. The preferred ratio is 0.75 to 1.5 of ammonia per mol of propylene.

The molar ratio of steam to propylene can range from 0 to about 7, but best results are obtianed with molar ratios of about 3 to 5 mols per mol of proylene and for this reason are preferred.

The contact time can vary considerably in the range of about 2 to 70 seconds calculated at 25° C. and 760 mm. Better results are obtained in a range of about 8 to 54 seconds and this range is preferred.

The reaction can be run at atmosphere pressure, in a partial vacuum or under induced pressure up to 50–100 p.s.i. Atmospheric pressure is preferred for fixed bed systems and a pressure of 1 to 50 p.s.i. for fluid bed reactions.

EXAMPLES 1–3

The thorium-containing catalyst used in these examples was prepared by the solution procedure (A) described above. It contained a molar ratio of $75MoO_3$, $25TeO_2$ and $25ThP_2O_7$. A high-silica glass (Vycor) tube 12 inches long and 30 mm. in outer diameter was filled with about 170 ml. of the catalyst. Three external electrically operated heating coils were wound on the reactor. One of the coils extended along the entire length of the reactor and each of the remaining coils extended about one half the length of the reactor. Outlet vapors were passed through a short water cooled condenser. Uncondensed gases were passed through a gas chromatograph (Perkin-Elmer Model 154D) and analyzed continuously. The liquid condenser was weighed and then analyzed for its acrylonitrile content in the gas chromatograph.

Steam at a temperature of 200–250° C. was first passed into this fixed bed reactor. Then a mixture of propylene and ammonia, and air were fed separately into the stream of water vapor. The mixture passed through a preheater and entered the reactor at a temperature of 200–250° C. The reactor was preheated to about 300° C. before the gas feed was begun. The molar ratio of the feed was 3 mols of oxygen (supplied as air) per mol of propylene. The mols of oxygen, water and ammonia per mol of propylene, and the temperature in the reactor and contact time (STP) are set forth in the table below.

| Run | Water, mols | Oxygen, mols | NH₃, Mols | Temperature, °C. | Contact time, seconds | Conversion, mol percent | Yield, Mol Percent | |
|---|---|---|---|---|---|---|---|---|
| | | | | | | | Acrylic acid | Acrylonitrile |
| 1 | 4.06 | 3.0 | 1.07 | 400 | 43.2 | 85.14 | 3.76 | 66.78 |
| 2 | 4.06 | 3.0 | 1.07 | 430 | 43.2 | 98.96 | 18.70 | 54.42 |
| 3 | 4.20 | 3.04 | 1.43 | 415 | 32.8 | 93.20 | 4.9 | 65.14 |

EXAMPLE 4

A supported catalyst prepared according to procedure (B) above was prepared to the ratio

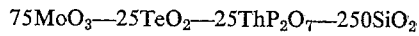

$75MoO_3$—$25TeO_2$—$25ThP_2O_7$—$250SiO_2$

The particle size was between 80 and 325 mesh. The runs were made in a fluidized bed. The reactor was a high-silica glass cylinder with an O.D. of 38 mm. and height of 12 inches. It was filled to a height about 6 inches with catalyst. In all cases the catalyst was fluidized by first injecting hot air into the reactor and then adding the requisite amounts of steam, ammonia and propylene. The gases were preheated to about 250° C. prior to entering the reactor. The reactor was heated externally with electrical resistance wire, and the reaction temperature was controlled by use of rheostats. The reactants in a molar ratio 3 mols of oxygen, 3.88 mols of steam and 0.9 mol of ammonia per mol of propylene were passed through the reactor at a contact time of 15.5 seconds and a reaction temperature of 390° C. 83 mol percent of the propylene was converted to give a mol percent yield of acrylonitrile of 58.55% and 10.61 mol percent acrylic acid. When the temperature was raised to 430° C., the conversion of propylene increased to 96.87% with mol percent efficiency to acrylonitrile of 51.47.

The hydrocarbons which are ammoxidized according to this invention have the formula

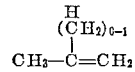

$$\overset{H}{\underset{|}{(CH_2)_{6-1}}}$$
$$CH_3-\overset{|}{C}=CH_2$$

The desired end products result from the ammoxidation of only one methyl group on the hydrocarbon molecule, while the terminal $CH_2\!=\!C\!<$ group remains intact. The nitriles produced can be defined as alpha, beta monoolefinically unsaturated nitriles having 3 to 4 carbon atoms and a terminal $CH_2\!=\!C\!<$ group or they can be defined by the general formula

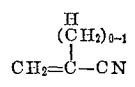

$$\overset{H}{\underset{|}{(CH_2)_{6-1}}}$$
$$CH_2=\overset{|}{C}-CN$$

I claim:
1. A method of producing compounds of the formula

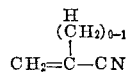

$$\overset{H}{\underset{|}{(CH_2)_{6-1}}}$$
$$CH_2=\overset{|}{C}-CN$$

comprising, passing a molecular oxygen-containing gas in a quantity sufficient to provide a molar ratio of from about 1.5 to about 4 mols of oxygen per mol of propylene or isobutylene hydrocarbons, one mol of said hydrocarbon, and from about 0.5 to 1.75 mols of ammonia per mol of said hydrocarbon, over a catalyst consisting essentially of molybdenum oxide, tellurium oxide and a thorium phosphate in a molar ratio of 100 molybdenum oxide, 10–100 tellurium oxide and 10–100 of a thorium phosphate at a temperature of from about 350° C. to about 500° C.

2. The method of claim 1 wherein there is 2 to 4 mols of oxygen, 0.75 to 1.5 mols of ammonia, the temperature is from about 375° C. to 480° C. and the contact time is from about 8 to 54 seconds.

3. The method of claim 2 wherein the hydrocarbon is propylene and the thorium phosphate is thorium pyrophosphate.

4. The method of claim 2 wherein the hydrocarbon is isobutylene and the thorium phosphate is thorium pyrophosphate.

5. The method of claim 2 wherein there is present in the reaction mixture from 0 to 7 mols of water vapor per mol of hydrocarbon.

6. The method of claim 3 wherein the molar ratio of oxygen is about 3 provided as air, the amount of water vapor is from about 3 to 5 mols per mol of propylene, and the contact time is about 8 to 54 seconds.

7. The method of claim 3 wherein the molar ratio of oxygen is about 3 provided as air, the amount of water vapor is from about 3 to 5 mols per mol of isobutylene, and the contact time is about 8 to 54 seconds.

References Cited

UNITED STATES PATENTS

| | | | |
|---|---|---|---|
| 3,161,671 | 12/1964 | Minekawa et al. | 260—465.3 |
| 3,164,626 | 1/1965 | Minekawa et al. | 260—465.3 |
| 3,164,628 | 1/1965 | Minekawa et al. | 260—465.3 |
| 3,226,421 | 12/1965 | Giordano et al. | 260—465.3 |

JOSEPH P. BRUST, *Primary Examiner.*

U.S. Cl. X.R.

252—437; 260—533